(12) United States Patent
Kawabata (10) Patent No.: US 9,191,519 B2
(45) Date of Patent: Nov. 17, 2015

(54) ECHO SUPPRESSOR USING PAST ECHO PATH CHARACTERISTICS FOR UPDATING

(71) Applicant: Oki Electric Industry Co., Ltd., Tokyo (JP)

(72) Inventor: Naoya Kawabata, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 14/335,451

(22) Filed: Jul. 18, 2014

(65) Prior Publication Data

US 2015/0086006 A1    Mar. 26, 2015

(30) Foreign Application Priority Data

Sep. 26, 2013  (JP) .................................. 2013-199967

(51) Int. Cl.
*H04M 9/08*  (2006.01)
*H04B 3/21*  (2006.01)

(52) U.S. Cl.
CPC . *H04M 9/082* (2013.01); *H04B 3/21* (2013.01)

(58) Field of Classification Search
None
See application file for complete search history.

(56) References Cited

U.S. PATENT DOCUMENTS

| 2009/0185515 A1* | 7/2009 | Sorensen et al. ............... 370/310 |
| 2010/0208908 A1* | 8/2010 | Hoshuyama ..................... 381/66 |
| 2012/0237047 A1* | 9/2012 | Neal et al. ......................... 381/66 |
| 2013/0216057 A1* | 8/2013 | Thyssen et al. ................. 381/66 |
| 2014/0162731 A1* | 6/2014 | Helsloot et al. ............... 455/570 |

OTHER PUBLICATIONS

Christof Faller et al., "Estimating the Delay and Coloration Effect of the Acoustic Echo Path for Low Complexity Echo Suppression", Proc. Intl. Works, on Acoust. Echo and Noise Control (IWAENC) 2005, pp. 53-56, Oct. 2005.

* cited by examiner

*Primary Examiner* — Fan Tsang
*Assistant Examiner* — Jeffrey Lytle
(74) *Attorney, Agent, or Firm* — Rabin & Berdo, P.C.

(57) ABSTRACT

In an echo suppressor, a frequency bin component detector compares a far-end signal amplitude spectrum with a threshold value for each frequency bin to determine whether or not each frequency bin includes a frequency component. A frequency bin echo path characteristic estimator uses the far-end signal amplitude spectrum in the frequency bins determined to have a frequency component by the frequency bin component detector and the near-end input signal amplitude spectrum of corresponding frequency bins to estimate the echo path characteristics of the frequency bins. An estimated echo signal calculation-and-echo suppressor section calculates estimated echo signals based on the echo path characteristic in each frequency bin and the far-end signal amplitude spectrum to suppress the estimated echo signals from the near-end input signal amplitude spectrum.

6 Claims, 3 Drawing Sheets

ECHO SUPPRESSOR USING PAST ECHO PATH CHARACTERISTICS FOR UPDATING

BACKGROUND OF THE INVENTION

1. Field of the Invention

The present invention relates to an echo suppressor, and more particularly to an echo suppressor for use in, for example, a telephonic conference system, such as a video teleconference system.

2. Description of the Background Art

For example, in a loudspeaker-assisted telephone conference system such as a video conference system or telephone conference system, when the talker speaks on a microphone, for example, part of his or her voice radiated from loudspeakers may be caught by microphones to return to the talker side in the form of acoustic echo signals. Since acoustic echo signals may severely hinder telephone speech quality, a lot of research and development has been heretofore conducted solutions for suppressing acoustic echo.

Solutions for suppressing acoustic echo may include echo suppressors. The echo suppressor may be implemented by a sort of calculator calculating echo path characteristics, estimated echo signals and an echo suppression gain from far-end and near-end input signals, and multiplying the near-end input signal by the echo suppression gain to thereby suppress acoustic echo signals. One of such echo suppressors is proposed by C. Faller, et al., "ESTIMATING THE DELAY AND COLORATION EFFECT OF THE ACOUSTIC ECHO PATH FOR LOW COMPLEXITY ECHO SUPPRESSION", Proc. Intl. Works, on Acoust. Echo and Noise Control (IWAENC) 2005, pp. 53-56, October 2005.

According to C. Faller, et al., the proposed echo suppressor calculates an echo path characteristic based on far-end and near-end input signals of past frames. The resultant echo path characteristic is multiplied by the far-end signal to obtain an estimated echo signal. The echo suppressor in turn calculates an echo suppression gain based on the near-end input signal and estimated echo signals. The near-end input signal is multiplied by the echo suppression gain, thus suppressing echo signals.

However, incoming far-end signals may generally include frequency bins corresponding to the valleys of the fine structures of speech signals and/or having frequency components smaller on the spectrum envelope of sound signals. Therefore, the frequency components of small frequency bins in a far-end signal may be buried in frequency components of the corresponding frequency bins of background noise.

Under those circumstances, when the echo suppressor set forth in C. Faller, et al., calculates out echo path characteristics of the frequency bins, values entirely different from actual echo path characteristics are obtained to update the echo path characteristics accordingly. Consequently, estimated echo path characteristics may become different from actual ones. This raises a problem that acoustic echo signals cannot be suppressed appropriately.

SUMMARY OF THE INVENTION

It is an object of the present invention to provide an echo suppressor capable of overcoming the problems raised in the prior art.

According to the present invention, for frequency bins of small frequency components in a far-end signal, the echo suppressor uses past estimated echo path characteristics to update the echo path characteristics, without using echo path characteristics calculated from near-end and far-end signals, thereby preventing echo path characteristics from being erroneously learned, and maintaining echo-suppressing performance.

According to an aspect of the present invention, the echo suppressor includes: a far-end signal amplitude spectrum calculator converting an incoming far-end signal in the time domain into a signal in the frequency domain and calculating a far-end signal amplitude spectrum of the far-end signal; a near-end input signal amplitude spectrum calculator converting a near-end input signal in the time domain into a signal in the frequency domain and calculating a near-end input signal amplitude spectrum of the near-end input signal; a frequency bin component detector comparing the far-end signal amplitude spectrum with a threshold value for a frequency bin to determine whether or not there is a frequency component in the frequency bin; a frequency bin echo path characteristic estimator using a far-end signal amplitude spectrum of the frequency bin determined to have a frequency component by the frequency bin component detector and a near-end input signal amplitude spectrum of a corresponding frequency bin of the near-end input signal to estimate an echo path characteristic of the frequency bin; an estimated-echo signal calculator calculating an estimated echo signal from the echo path characteristic for the frequency bin estimated by the frequency bin echo path characteristic estimator and the far-end signal amplitude spectrum; and an echo suppressor suppressing the estimated echo signal from the near-end input signal amplitude spectrum.

According to another aspect of the present invention, a non-transitory computer-readable storage medium storing an echo suppression program instructing a computer to function as the echo suppressor defined above.

According to the present invention, for frequency bins in which a far-end signal contains small frequency components, past estimated echo path characteristics are used for calculating present estimated echo path characteristics to update the echo path characteristics with the estimated echo path characteristics, thereby preventing echo path characteristics from erroneously being learned, and maintaining echo-suppressing performance.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Preferred embodiments of the echo suppressor of the present invention will be described in detail with reference to the accompanying drawings. A preferred embodiment of the invention shown in FIG. 1 may exemplarily be applied to an echo suppressor for use in a speech signal transmitter/receiver in a loudspeaker-assisted telephone conference system such as a video teleconference system or a telephone conference system.

Figure 1:
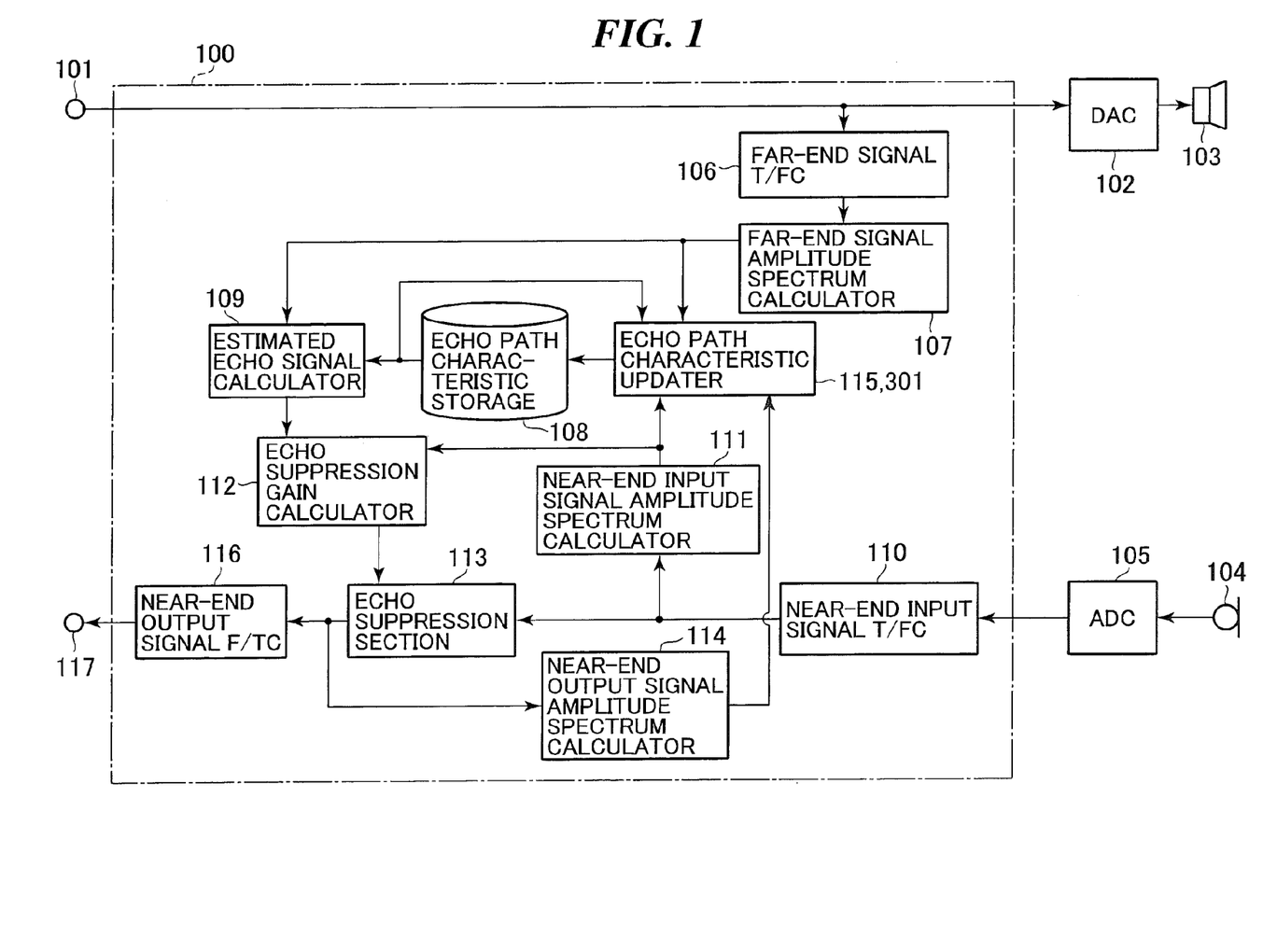
FIG. 1 is a schematic block diagram showing the configuration of an echo suppressor according to a preferred embodiment of the present invention.

FIG. 1 is a schematic block diagram showing the configuration of an echo suppressor 100 according to the preferred embodiment. The echo suppressor 100 may include as its portion a type of echo suppressor set forth in C. Faller, et al., described earlier. In the echo suppressor 100, when a far-end signal produced by a loudspeaker is caught by a microphone on a near-end side so that it would otherwise form acoustic echo signals, then the suppressor 100 suppresses the acoustic echo signals in a near-end input signal, thus appropriately minimizing the acoustic echo signals.

The echo suppressor, or echo suppressor arrangement, 100 may be formed into, for example, a circuit board dedicated therefor, or alternatively may be implemented in the form of echo suppression program sequences stored in a DSP (digital signal processor). Further alternatively, it may be implemented a processor system, or computer, including a CPU (Central Processor Unit), adapted for executing echo suppression program sequences stored therein. In any of those implementations, the suppressor 100 can be functionally represented by functional blocks shown in FIG. 1. Such program sequences may be stored in and provided by non-transitory computer-readable storage media, such as non-volatile semiconductor memory devices, magnetic storage media, optical storage media and magneto-optical storage media.

Continuing to refer to FIG. 1, the echo suppressor 100 includes a far-end signal input port 101, a digital-to-analog converter (DAC) 102, a loudspeaker 103, a microphone 104, an analog-to-digital converter (ADC) 105, a far-end signal time-to-frequency domain converter (T/FC) 106, a far-end signal amplitude spectrum calculator 107, an estimated-echo path characteristic storage 108, an estimated-echo signal calculator 109, a near-end input signal time-to-frequency domain converter 110, a near-end input signal amplitude spectrum calculator 111, an echo suppression gain calculator 112, an echo suppression section 113, a near-end output signal amplitude spectrum calculator 114, an estimated-echo path characteristic updater 115, a near-end output signal frequency-to-time domain converter (F/TC) 116, and a near-end signal output port 117, which are interconnected as depicted.

The far-end signal input port 101 is provided for receiving a digital sound signal incoming as a far-end signal from a far-end side over a telecommunications network, not shown. The telecommunications network may be, e.g. an Internet-protocol (IP) network, and also may be wired or on radio waves provided by a wireless network such as cellular phone network. The received far-end signal is supplied to the DAC 102 and the far-end signal time-to-frequency domain converter 106.

The DAC 102 is adapted to convert a far-end signal fed from the input port 101 in the form of digital signal into a corresponding analog signal to supply the latter to the loudspeaker 103.

The loudspeaker 103 serves as producing an analog sound signal, delivered from the DAC 102, in the form of audible sound.

The microphone 104 functions as catching sound at a near end to convert the caught sound into a corresponding analog electric sound signal to output the analog sound signal to the ADC 105. The microphone 104 may also capture environmental sound and acoustic echo, which may be mixed with the sound of speech of the talker at the near end. In the context, acoustic echo is a sound signal resultant, on the near-end side, from such part of the sound emitted by the loudspeaker 103 that the microphone 104 catches after having propagated via air space.

The ADC 105 serves to convert an analog sound signal provided from the microphone 104 into a corresponding digital sound signal to output the digital signal as a near-end input signal to the near-end input signal time-to-frequency domain region converter 110.

The far-end signal time-to-frequency domain converter 106 is adapted to convert a far-end signal received on the far-end signal input port 101, i.e. a signal in the time domain, into a frequency spectrum, i.e. a signal in the frequency domain, by the Fast Fourier Transform (FFT), for example, to output data representative of the resultant frequency spectrum to the far-end signal amplitude spectrum calculator 107.

The far-end signal amplitude spectrum calculator 107 is adapted to use data of a far-end signal frequency spectrum provided by the far-end signal time-to-frequency domain converter 106 to calculate a far-end signal amplitude spectrum of the far-end signal. The spectrum calculator 107 outputs data representative of the far-end signal amplitude spectrum thus calculated to the estimated-echo path characteristic updater 115 and the estimated-echo signal calculator 109.

The estimated-echo path characteristic storage 108 may be or include a storage area in which data of estimated echo path characteristics may be stored in association with respective frequency bins.

The estimated-echo signal calculator 109 is adapted for using a far-end signal amplitude spectrum provided from the far-end signal amplitude spectrum calculator 107 to calculate an estimated echo signal, which will in turn be stored into the estimated-echo path characteristic storage 108. The estimated-echo signal calculator 109 outputs the estimated echo signal to the echo suppression gain calculator 112.

The near-end input signal time-to-frequency domain converter 110 functions to convert a near-end input signal delivered from the ADC 105, i.e. a signal in the time domain also, into a frequency spectrum, i.e. a signal in the frequency domain, by the FFT, for example, to output data representing the resultant frequency spectrum to the near-end input signal amplitude spectrum calculator 111 and the echo suppressing portion 113.

The near-end input signal amplitude spectrum calculator 111 is adapted to use a near-end input signal frequency spectrum delivered from the near-end input signal time-to-frequency domain converter 110 to calculate a near-end input signal amplitude spectrum of the near-end input signal to output data representing the resulting amplitude spectrum to the estimated-echo path characteristic updater 115 and the echo suppression gain calculator 112.

The echo suppression gain calculator 112 serves as using an estimated echo signal amplitude spectrum output from the estimated-echo signal calculator 109 and a near-end input signal amplitude spectrum provided from the near-end input signal amplitude spectrum calculator 111 to calculate an echo suppression gain for use in suppressing echo from the near-end input signal. The gain calculator 112 outputs the calculated echo suppression gain to the echo suppression section 113.

The echo suppression section 113 is adapted for multiplying a near-end input signal frequency spectrum delivered from the near-end input signal time-to-frequency domain converter 110 by an echo suppression gain output by the echo suppression gain calculator 112 to thereby obtain the frequency spectrum having acoustic echo signals suppressed from the near-end input signal. The echo suppression section 113 outputs the frequency spectrum as a near-end output signal to the near-end output signal amplitude spectrum calculator 114 and the near-end output signal frequency-to-time domain converter 116.

The near-end output signal amplitude spectrum calculator 114 functions as using the frequency spectrum, or near-end output signal having echo thus suppressed, delivered from the echo suppression section 113 to calculate a near-end output signal amplitude spectrum. The near-end output signal amplitude spectrum calculator 114 outputs data of the resulting near-end output signal amplitude spectrum to the estimated-echo path characteristic updater 115.

The estimated-echo path characteristic updater 115 is adapted to use a far-end signal amplitude spectrum output from the far-end signal amplitude spectrum calculator 107, a near-end input signal amplitude spectrum output from the near-end input signal amplitude spectrum calculator 111, and a near-end output signal output from the near-end output signal amplitude spectrum calculator 114 to decide whether or not the present frame under processing is a single-talk frame. In the context, the single-talk is a state in which only acoustic echo signals are input to the microphone 104 without near-end talker's speech signals. Other than the single-talk is a state, the double-talk or no input on the microphone 104. The double-talk is a state where acoustic echo signals and near-end talk is speech signals are simultaneously input to the microphone 104.

If the estimated-echo path characteristic updater 115 determines that there is a frequency component for each frequency bin in the far-end signal amplitude spectrum, the present frame is a single-talk frame. If, for the frequency bin, it is decided that there is a frequency component in the frame, the updater 115 calculates a present echo path characteristic at the frequency bin to update the characteristic stored in the estimated-echo path characteristic storage 108, thus echo path characteristics being updated for the respective frequency bins. Otherwise, the updater 115 will use, without updating the echo path characteristics, the data of the frequency bins of past echo path characteristics stored in the estimated-echo path characteristic storage 108. That prevents echo path characteristics from being erroneously learned, and maintains echo-suppressing performance.

When the present frame is not decided to be a single-talk frame, the updater does not update the echo path characteristics stored in the estimated-echo path characteristic storage 108.

The near-end output signal frequency-to-time domain converter 116 is adapted to convert a near-end output signal frequency spectrum delivered from the echo suppression section 113 into a time domain signal of the near-end output signal by, for example, the Inverse Fast Fourier Transform (IFFT) to output the resultant near-end output signal on the near-end signal output port 117.

The near-end signal output port 117 is arranged for sending out a near-end output signal in the form of digital signal delivered from the near-end output signal frequency-to-time domain converter 116 toward a far-end side with which the near-end talker is communicating.

Figure 2:
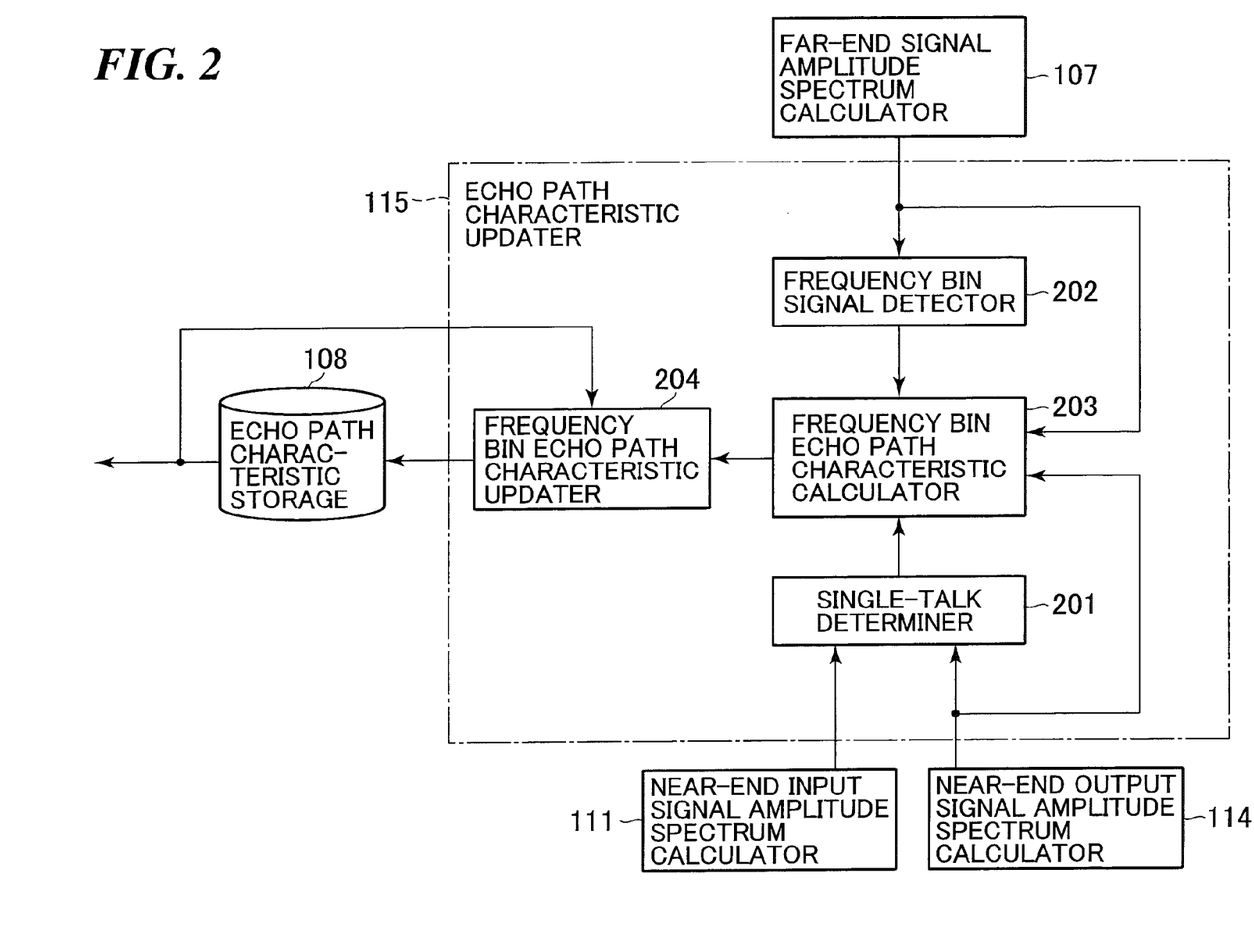
FIG. 2 is a schematic block diagram showing details of the configuration of the estimated-echo path characteristic updater of the echo suppressor shown in FIG. 1.

FIG. 2 is a schematic block diagram showing details of the configuration of the estimated-echo path characteristic updater 115 of the illustrative preferred embodiment. As seen from the figure, the estimated-echo path characteristic updater 115 includes a single-talk determiner 201, a frequency bin signal detector 202, a frequency bin echo path characteristic calculator 203, and a frequency bin echo path characteristic updater 204, which are interconnected as illustrated.

The single-talk determiner 201 is adapted to decide whether or not the present frame output from the near-end input signal amplitude spectrum calculator 111 is a single-talk frame for each frame. The single-talk determiner 201 outputs the result of the decision to the frequency bin echo path characteristic calculator 203.

The frequency bin signal detector 202 is arranged to use a far-end signal amplitude spectrum output from the far-end signal amplitude spectrum calculator 107 for each frequency bin to decide whether or not there is a frequency component. The frequency bin signal detector 202 outputs the result of the decision on the presence or absence of the signal for each frequency bin to the frequency bin echo path characteristic calculator 203.

The frequency bin echo path characteristic calculator 203 is adapted to calculate, in the case of a single-talk frame and frequency bins decided as containing frequency components, an echo path characteristic for each frequency bin. In frames decided as single-talk ones by the single-talk determiner 201, when the frequency bin signal detector 202 detects frequency bins decided to contain frequency components, the frequency bin echo path characteristic calculator 203 calculates, using the far-end signal amplitude spectrum output from the far-end signal amplitude spectrum calculator 107 and the near-end output signal output from the near-end output signal amplitude spectrum calculator 114, the echo path characteristic of those frequency bins in those frames. The frequency bin echo path characteristic calculator 203 outputs the data of the calculated echo path characteristics to the frequency bin echo path characteristic updater 204.

The frequency bin path characteristic updater 204 is adapted to use the echo path characteristics of the frequency bins output from the frequency bin echo path characteristic calculator 203 to update echo path characteristics data stored in the estimated-echo path characteristic storage 108. At that time, the updater 204 updates the characteristics only for frequency bins the frequency bin echo path characteristic calculator 203 has calculated, and not for frequency bins the calculator 203 has not calculated. In that way, when for a single-talk frame the frequency bins of a far-end signal amplitude spectrum are equal to or larger than the threshold value, echo path characteristics for those frequency bins can be updated.

In operation, the echo suppressor 100 suppresses acoustic echo signals in the fashion described in detail below. After the echo suppressor 100 is made activated, a digital sound signal is received on the far-end signal input port 101 as a far-end input signal from the far-end side over the telecommunications network, not shown.

The far-end signal thus received on the far-end signal input port 101 is supplied as a far-end signal to the DAC 102 and the far-end signal time-to-frequency domain converter 106. The DAC 102 converts the far-end digital signal provided from the input port 101 into a corresponding analog signal, and supplies the analog signal to the loudspeaker 103. The analog signal supplied from the DAC 102 is in turn output from the loudspeaker 103 as audible sound.

The microphone 104 may pick up speech uttered by the talker at the near end together with environmental sound and acoustic echo signals mixed. The microphone 104 converts the mixed sound signals into a corresponding analog electric signal. The analog signal is supplied to the ADC 105.

The ADC 105 samples, quantizes and encodes the analog sound signal provided from the microphone 104 to thereby convert the analog signal into a digital sound signal. The digital sound signal is then supplied as a near-end input signal to the near-end input signal time-to-frequency domain converter 110.

The far-end signal time-to-frequency domain converter 106 converts the far-end signal into a frequency spectrum, ROUT (i, ω), by the FFT in the illustrative embodiment. The resulting frequency spectrum, ROUT (i, ω), is delivered to the far-end signal amplitude spectrum calculator 107.

The far-end signal amplitude spectrum calculator 107 calculates a far-end signal amplitude spectrum, |ROUT (i, ω)|, in accordance with Expression (1) using the frequency spectrum, ROUT (i, ω), which is output from the far-end signal time-to-frequency domain converter 106.

$$|ROUT(i, \omega)| = \sqrt{(ROUT\_real(i, \omega))^2 + (ROUT\_image(i, \omega))^2} \quad (1)$$

where i is the number of a frame and ω is a frequency bin. ROUT_real (i, ω) and ROUT_image (i, ω) indicate the real part and the imaginary part, respectively, at the frequency bin ω of a far-end signal frequency spectrum in a frame i. The frequency spectrum ROUT (i, ω) can be given by Expression (2), where j is the imaginary unit.

$$ROUT(i,\omega)=ROUT\_real(i,\omega)+j\cdot ROUT\_image(i,\omega) \quad (2)$$

The calculated far-end signal frequency spectrum, |ROUT (i, ω)|, is provided to the estimated-echo path characteristic updater 115 and the estimated-echo signal calculator 109.

The estimated-echo signal calculator 109 calculates an estimated echo signal amplitude spectrum, |ECHO (i, ω)|, using Expression (3), the far-end signal amplitude spectrum, |ROUT (i, ω)|, which is output from the far-end signal amplitude spectrum calculator 107 and the echo path characteristic, |H (i, ω)|, stored in the estimated-echo path characteristic storage 108. In particular, the estimated-echo signal calculator 109 multiplies the far-end signal amplitude spectrum, |ROUT (i, ω)|, by the echo path characteristic, |H (i, ω)|, for each frequency bin, thus calculating the estimated echo signal amplitude spectrum, |ECHO (i, ω)|, of this frequency bin.

$$|ECHO(i,\omega)|=|H(i,\omega)|\cdot |ROUT(i,\omega)| \quad (3)$$

On the other hand, the near-end input signal time-to-frequency domain converter 110 converts the near-end input signal into a frequency spectrum, SIN (i, ω), by the FFT in the illustrative embodiment. The resulting frequency spectrum, SIN (i, ω), is fed to the near-end input signal amplitude spectrum calculator 111 and the echo suppression section 113.

The near-end input signal amplitude spectrum calculator 111 calculates a near-end input signal amplitude spectrum, |SIN (i, ω)|, in accordance with Expression (4) using the near-end input signal frequency spectrum, SIN (i, ω), from the near-end input signal time-to-frequency domain converter 110.

$$|SIN(i, \omega)| = \sqrt{(SIN\_real(i, \omega))^2 + (SIN\_image(i, \omega))^2} \quad (4)$$

where SIN_real (i, ω) and SIN_image (i, ω) indicate the real part and the imaginary part, respectively, at the frequency bin ω of the near-end input signal frequency spectrum in frame i, as the case with the expression described so far. The near-end input signal frequency spectrum, SIN (i, ω), can be given by Expression (5), where j is the imaginary unit.

$$SIN(i,\omega)=SIN\_real(i,\omega)+j\cdot SIN\_image(i,\omega) \quad (5)$$

The calculated near-end input signal amplitude spectrum, |SIN (i, ω)|, is supplied to the echo suppression gain calculator 112 and the estimated-echo path characteristic updater 115.

The echo suppression gain calculator 112 calculates the echo suppression gain, G (i, ω), in accordance with Expression (6), using the estimated echo signal amplitude spectrum, |ECHO (i, ω)|, which is output from the estimated-echo signal calculator 109 and the near-end input signal amplitude spectrum, |SIN (i, ω)|, which is output from the near-end input signal amplitude spectrum calculator 111. In particular, the echo suppression gain calculator 112 calculates the echo suppression gain, G (i, ω), in accordance with Expression (6) using the near-end input signal amplitude spectrum, |SIN (i, ω)|, and the estimated echo signal amplitude spectrum, |ECHO (i, ω)|. The echo suppression gain, G (i, ω), is calculated to divide an amplitude spectrum, which is a difference between the near-end input signal amplitude spectrum, |SIN (i, ω)|, and the estimated echo signal amplitude spectrum, |ECHO (i, ω)|, by the near-end input signal amplitude spectrum, |SIN (i, ω)|, for each frequency bin.

$$G(i, \omega) = \frac{|SIN(i, \omega)| - |ECHO(i, \omega)|}{|SIN(i, \omega)|} \quad (6)$$

The echo suppression section 113 suppresses the acoustic echo signals superimposed on the near-end input signal spectrum, SIN (i, ω), in accordance with Expressions (7) and (8) using the real and imaginary parts of the near-end input signal spectrum, SIN (i, ω), which is output from the near-end input signal time-to-frequency domain converter 110 and the echo suppression gain, G (i, ω), which is output from the echo suppression gain calculator 112. Specifically, the echo suppression section 113 calculates a near-end signal frequency spectrum, SOUT (i, ω), by multiplying the real and imaginary parts of the near-end output signal frequency spectrum by the echo suppression gain G (i, ω) for each frequency bin.

$$SOUT\_real(i,\omega)=G(i,\omega)\cdot SIN\_real(i,\omega) \quad (7)$$

$$SOUT\_image(i,\omega)=G(i,\omega)\cdot SIN\_image(i,\omega) \quad (8)$$

where SOUT_real (i, ω) and SOUT_image (i, ω) indicate the real part and the imaginary part, respectively, at the frequency bin ω of the near-end output signal frequency spectrum in a frame i as the case with the expression described so far. The near-end output signal frequency spectrum, SOUT (i, ω), can be given by Expression (9), where j is the imaginary unit again.

$$SOUT(i,\omega)=SIN\_real(i,\omega)+j\cdot SIN\_image(i,\omega) \quad (9)$$

The calculated near-end output signal frequency spectrum, |SOUT (i, ω)|, is output to the near-end output signal amplitude spectrum calculator 114 and the near-end output signal frequency-to-time domain converter 116.

The near-end output signal spectrum calculator 114 calculates the near-end output signal spectrum, SOUT (i, ω), in accordance with Expression (10), using the near-end output signal frequency spectrum, SOUT (i, ω), which is output from the echo suppression section 113.

$$|SOUT(i, \omega)| = \sqrt{(SOUT\_real(i, \omega))^2 + (SOUT\_image(i, \omega))^2} \quad (10)$$

In the estimated-echo path characteristic updater 115, the single-talk determiner 201 compares the near-end input signal amplitude spectrum, |SIN (i, ω)|, with the near-end output signal amplitude spectrum, |SOUT (i, ω)|, for each frame and decides whether or not the present frame is a single-talk frame. For example, the single-talk determiner 201 compares the near-end input signal amplitude spectrum, |SIN (i, ω)|, which is output from the near-end input signal amplitude spectrum calculator 111 with the amplitude output signal amplitude spectrum, |SOUT (i, ω)|, which is output from the near-end output signal spectrum calculator 114 for each frame. If the near-end input signal amplitude spectrum is much smaller than the near-end input signal amplitude spectrum, the determiner 201 decides that the present frame is a single-talk frame. Otherwise, the determiner 201 decides that the present frame is not a single-talk frame.

The frequency bin signal detector 202 decides whether or not there is a frequency component using the far-end signal amplitude spectrum output from the far-end signal amplitude spectrum calculator 107 for each frequency bin. For example, the detector 202 compares the far-end signal amplitude spectrum, |ROUT (i, ω)|, in the present frame with a threshold value TH (i, ω) for each frequency bin. If the value of the far-end signal amplitude spectrum, |ROUT (i, ω)|, is larger than the threshold value, TH (i, ω), it is decided that there is a frequency component in this frequency bin. By contrast, if the value of the far-end signal amplitude spectrum, |ROUT (i, ω)|, is not larger than the threshold value, TH (i, ω), it is decided that there is no frequency component in this frequency bin. The result of the decision is output to the frequency bin echo path characteristic calculator 203.

In order to prevent far-end signal background noise from being decided to have a frequency component, the threshold value, TH (i, ω), is preferably set substantially higher than the level of far-end signal background noise. For example, the threshold value may be twice as high as the frame-averaged value of the level of background noise of a far-end signal. Furthermore, the threshold value, TH (i, ω), may be set to values different from frequency bin by bin.

The frequency bin echo path characteristic calculator 203 calculates the present echo path characteristic, |H1 (i, ω)|, of frequency bins decided to include a frequency component on the far-end signal amplitude spectrum, |ROUT (i, ω)|, in the decided single-talk frame using the far-end signal amplitude spectrum, |ROUT (i, ω)|, which is output from the far-end signal amplitude spectrum calculator 107 and the far-end signal amplitude spectrum, |SIN (i, ω)|, which is output from the near-end output signal amplitude spectrum calculator 114 in accordance with Expression (11).

$$|H1(i, \omega)| = \frac{|SIN(i, \omega)|}{|ROUT(i, \omega)|} \quad (11)$$

$$(ROUT(i, \omega) > TH(i, \omega))$$

The frequency bin echo path characteristic updater 204 updates the echo path characteristic, |H (i, ω)|, which is stored in the estimated-echo path characteristic storage 108 using the echo path characteristic, |H (i, ω)|, and the echo path characteristic, |H1 (i, ω)|, which is obtained from the frequency bin echo path characteristic calculator 203. At this time, the echo path characteristics are updated only for frequency bins decided to contain frequency components by the frequency bin signal detector 202. For frequency bins decided to have no frequency components, the echo path characteristics will not be updated but the echo path characteristics, |H (i, ω)|, of the frequency bins stored in the estimated-echo path characteristic storage 108 will be used.

In particular, the frequency bin echo path characteristic updater 204 updates the echo path characteristic, |H (i, ω)|, in accordance with Expression (12).

$$|H(i+1, \omega)| = \qquad (12)$$
$$\left\{ \begin{array}{cc} (1-a) \cdot |H1(i, \omega)| + a \cdot |H(i, \omega)| & (RIN(i, \omega) > TH(i, \omega)) \\ |H(i, \omega)| & (\text{otherwise}) \end{array} \right\}$$

where a is a coefficient of a time-constant filter and equal to or less than unity. Preferably, a is close to unity, for example, a=0.99.

In particular, with respect to the frequency bins in which the far-end signal amplitude spectrum, |ROUT (i, ω)|, has a frequency component, the frequency bin echo path characteristic updater 204 calculates the frequency bins of the next frame echo path characteristics, |H (i+1, ω)|, using the frequency bins of the echo path characteristics, |H (i, ω)|, which are stored in the estimated-echo path characteristic storage 108 and the frequency bins of the echo path characteristics, |H1 (i, ω))|, which are calculated by the frequency bin echo path characteristic calculator 203. Furthermore, with respect to frequency bins in which the far-end signal amplitude spectrum, ROUT (i, ω), has no frequency component, the frequency bin echo path characteristic updater 204 uses these frequency bins of the echo path characteristics, |H (i, ω)|, stored in the estimated-echo path characteristic storage 108.

The near-end output signal frequency spectrum, SOUT (i, ω), in which acoustic echo signals have been suppressed by the echo suppression section 113 is calculated using Expression (9) from SOUT_real (i, ω) and from SOUT_image (i, ω), and input to the near-end output signal frequency-to-time domain converter 116.

The near-end output signal frequency-to-time domain converter 116 converts the near-end output signal spectrum, SOUT (i, ω), into a time domain signal of the near-end output signal by, for example, the IFFT and outputs the resultant near-end output signal to the near-end signal output port 117.

From the near-end signal output port 117, the near-end output signal delivered from the frequency-to-time domain converter 116 in the form of digital signal is transmitted toward a far-end side over the telecommunications network, not shown.

As described so far, according to the illustrative preferred embodiment, even when the frequency bins in which the far-end signal frequency components are lower in level, the echo path characteristics are not updated. Hence, this prevents erroneous learning of the echo path characteristics, and acoustic echo signals can be suppressed.

An alternative embodiment of the echo suppressor according to the invention will be described with further reference to FIG. 3. The instant alternative embodiment may be similar in configuration to the echo suppressor 100 of FIG. 1 except for the configuration of the echo path characteristic updater. The configuration of the echo path characteristic updater, 301, according to the present alternative embodiment will be described in detail by referring to FIGS. 1 and 3.

Figure 3:
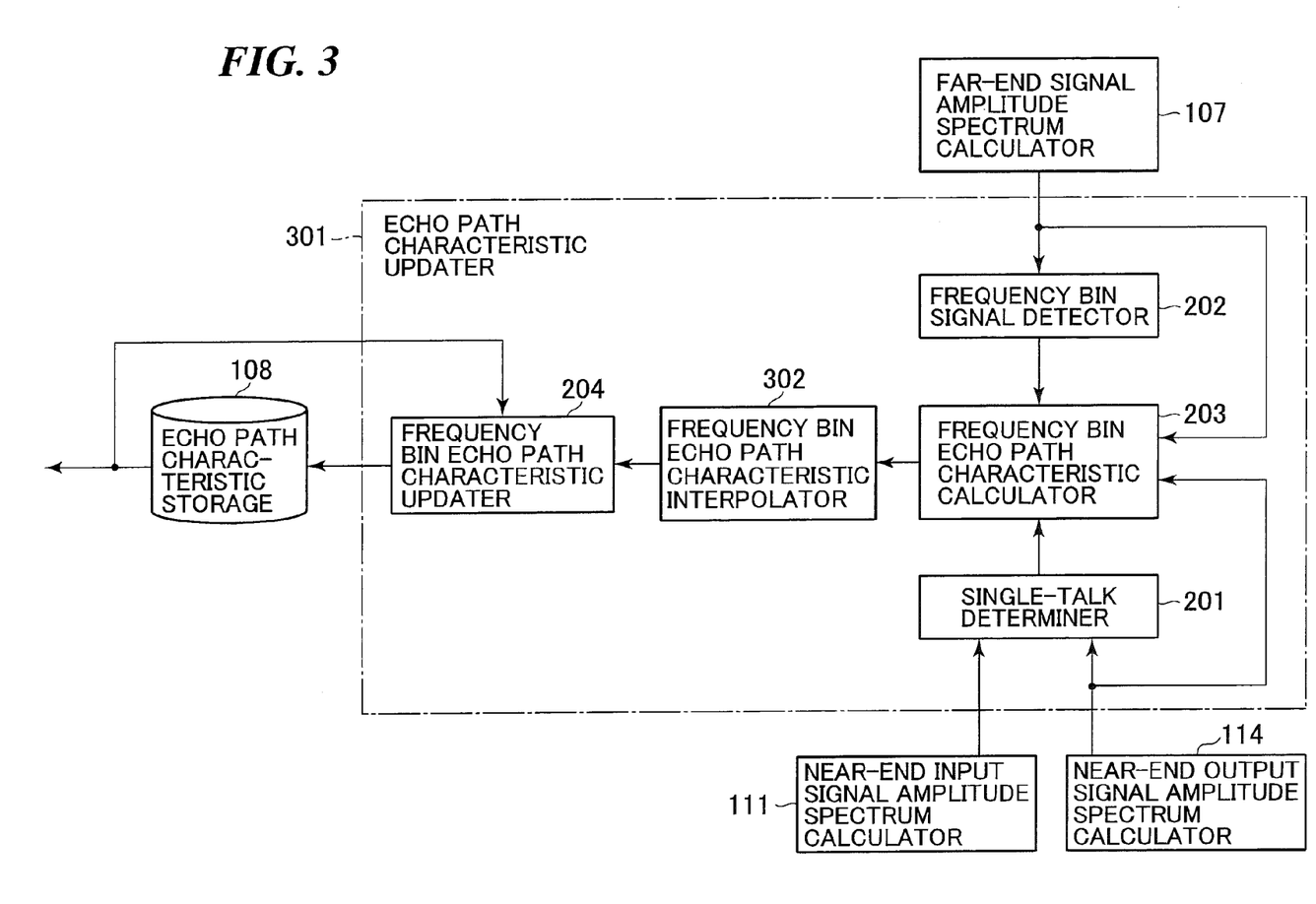
FIG. 3 is a schematic block diagram showing details of the configuration of the estimated-echo path characteristic updater of an echo suppressor according to an alternative embodiment of the invention.

FIG. 3 is a schematic block diagram of the echo path characteristic updater 301 of the alternative embodiment, showing details of its configuration. As seen from the figure, the echo path characteristic updater 301 includes an echo path characteristic interpolator 302 in addition to the single-talk determiner 201, frequency bin signal detector 202, frequency bin echo path characteristic calculator 203 and frequency bin echo path characteristic updater 204 already described. Throughout the disclosure, like components are designated with the same reference numerals, and a repetitive description thereon may be avoided for brevity.

The echo path characteristic interpolator 302 is arranged to interpolate the echo path characteristics for frequency bins calculated by the frequency bin echo path characteristic calculator 203 to output the interpolated echo path characteristics for the individual frequency bins to the frequency bin echo path characteristic updater 204.

Thus, the frequency bin echo path characteristic updater 204 uses the echo path characteristics for the frequency bin corrected by the echo path characteristic interpolator 302 to update the echo path characteristics for the frequency bin held in the estimated-echo path characteristic storage 108.

In operation, the echo suppressor 100 of the instant alternative embodiment suppresses echo in a manner described in detail below. Especially, the description will be focused on the operation of the echo path characteristic updater 301 of the echo suppressor 100.

In the echo path characteristic updater 301, the single-talk determiner 201 decides whether or not the present frame is a single-talk frame for each frame using the near-end input signal amplitude spectrum, $|SIN(i, \omega)|$, and the near-end output signal amplitude spectrum, $|SOUT(i, \omega)|$, for each frequency bin in the same way as in the illustrative embodiment shown in FIG. 2, and outputs a determination result from the decision to the frequency bin echo path characteristic calculator 203.

The frequency bin signal detector 202 also decides whether or not there is a frequency component in the far-end signal amplitude spectrum, $|ROUT(i, \omega)|$, for each frequency bin in the same way as in the illustrative embodiment shown in FIG. 2, and outputs a determination result from the decision to the frequency bin echo path characteristic calculator 203.

As in the same way as in the previous embodiment, the frequency bin echo path characteristic calculator 203 calculates the present echo path characteristics, $|H1(i, \omega)|$, of frequency bins which are decided to include a frequency component on the far-end signal amplitude spectrum $|ROUT(i, \omega)|$ in the decided single-talk frame using the far-end signal amplitude spectrum, $|ROUT(i, \omega)|$, and the near-end input signal amplitude spectrum, $|SIN(i, \omega)|$, in accordance with Expression (11). The frequency bin echo path characteristic calculator 203 outputs the present echo path characteristics $|H1(i, \omega)|$ for the frequency bins to the echo path characteristic interpolator 302.

The echo path characteristic interpolator 302 obtains the echo path characteristics $|H1(i, \omega)|$ of the frequency bins from the frequency bin echo path characteristic calculator 203. At this time, for frequency bins which the frequency bin signal detector 202 has determined as having no frequency component falling between frequency bins in the far-end signal amplitude spectrum determined to have frequency components, which bins may be referred to as a first frequency bins $\omega 1$, and frequency bins determined to contain frequency components following the first frequency bins, which may be referred to as a second frequency bins $\omega 2$. The interpolator 302 uses the echo path characteristics, $|H1(i, \omega 1)|$, of the first frequency bins and the echo path characteristics, $|H1(i, \omega 2)|$, of the second frequency bins to interpolate the echo path characteristics, $|H1(i, \omega)|$, of the frequency bins determined to have no corresponding frequency components.

The echo path characteristic interpolator 302 may be adapted to perform interpolation in various ways. For example, the echo path characteristics, $|H1(i, \omega 1)|$, of the first frequency bins and the echo path characteristics, $|H1(i, \omega 2)|$, of the second frequency bins may be used to obtain echo path characteristics, $|H1(i, \omega)|$, of the frequency bins which have been determined to have no frequency components by a linear interpolation in accordance with Expression (13).

$$|H_1(i, \omega)| = \frac{|H_1(i, \omega 2)| - |H_1(i, \omega 1)|}{(\omega 2 - \omega 1)} \cdot \omega \quad (13)$$

$$(\omega 1 < \omega < \omega 2)$$

In the same way as in the previous embodiment, the frequency bin echo path characteristic updater 204 uses the echo path characteristic, $|H(i, \omega)|$, held in the estimated-echo path characteristic storage 108 and the echo path characteristic $|H1(i, \omega)|$ interpolated by the echo path characteristic interpolator 302 to update the echo path characteristic for each frequency bin in accordance with Expression (14).

$$|H(i,\omega)|=(1-\alpha)\cdot|H_1(i,\omega)|+\alpha\cdot|H(i-1,\omega)| \quad (14)$$

As described so far, the present alternative embodiment also involves the advantageous effects of the illustrative embodiment shown in FIG. 2. In addition, even when the frequency bins of the far-end signal amplitude spectrum are small, echo path characteristics can be calculated by interpolation. The echo path characteristics of frequency bins where the frequency components of a near-end input signal are small can be updated. Hence, the echo path characteristics of the frequency bins where the frequency components are small are updated, whereby acoustic echo signals can be suppressed.

With respect to the above-described embodiments, their various modifications have been described. The present invention can also be applied to the following modifications.

The echo suppressor in the above-described embodiments may be incorporated in an apparatus including a speech communication device for use in, for example, a video conference system, a telephone conference system, or the like. Furthermore, the echo suppressor of the present invention may be incorporated in a mobile communication terminal such as a cellular phone, including a feature phone and a smartphone.

The illustrative embodiments described above are adapted to update echo path characteristics for frequency bins in the case of single-talk. However, the system may be adapted such as not to update echo path characteristics for frequency bins if the single-talk determiner has determined that the current frame is not a single-talk one.

The entire disclosure of Japanese patent application No. 2013-199967 filed on Sep. 26, 2013, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. An echo suppressor apparatus comprising:
a far-end signal amplitude spectrum calculator converting a far-end output signal into a frequency domain and calculating a far-end output signal amplitude spectrum of the far-end output signal;
a near-end input signal amplitude spectrum calculator converting a near-end input signal into a frequency domain and calculating a near-end input signal amplitude spectrum of the near-end input signal;

a frequency bin component detector using the far-end output signal amplitude spectrum to determine whether or not there is a frequency component in each of a plurality of frequency bins of the frequency domain of the far-end output signal;

a frequency bin echo path characteristic estimator using both a far-end output signal amplitude spectrum of each determined frequency bin among said plurality of frequency bins determined to have a frequency component by said frequency bin component detector and a near-end input signal amplitude spectrum of a corresponding frequency bin of the near-end input signal, to estimate an echo path characteristic of said each determined frequency bin;

an estimated-echo signal calculator calculating an estimated echo signal from the echo path characteristic for said each determined frequency bin; and an echo suppressor suppressing the estimated echo signal from the near-end input signal amplitude spectrum.

2. The apparatus in accordance with claim 1, further comprising an echo path characteristic storage storing therein the echo path characteristic for said each determined frequency bin, said frequency bin echo path characteristic estimator updating the echo path characteristic stored in said echo path characteristic storage for said each determined frequency bin.

3. The apparatus in accordance with claim 2, wherein said frequency bin echo path characteristic estimator updates the echo path characteristic for said each determined frequency bin in which the far-end signal amplitude spectrum is determined to have a frequency component, and does not update the echo path characteristic for the frequency bin in which the far-end signal amplitude spectrum is determined to have no frequency component.

4. The apparatus in accordance with claim 2, wherein said frequency bin echo path characteristic estimator interpolates the echo path characteristic of any frequency bin in which the far-end output signal is determined to have no amplitude spectrum component and which appears between a first frequency bin where there is a frequency component corresponding to the far-end output signal amplitude spectrum and a second frequency bin following the first frequency bin without having a frequency component corresponding to the far-end output signal amplitude spectrum, to update the echo path characteristic accordingly.

5. The apparatus in accordance with claim 1, wherein said frequency bin component detector compares the far-end output signal amplitude spectrum with a threshold value for each frequency bin to determine whether or not there is the frequency component.

6. A non-transitory computer-readable storage medium storing an echo suppression program instructing a computer to function as:

a far-end signal amplitude spectrum calculator converting an incoming far-end input signal into a frequency domain and calculating a far-end output signal amplitude spectrum of the far-end output signal;

a near-end input signal amplitude spectrum calculator converting a near-end input signal into a frequency domain and calculating a near-end input signal amplitude spectrum;

a frequency bin component detector comparing the amplitude spectrum of the far-end output signal of each of a plurality of frequency bins with a threshold value to make a decision as to whether or not there is a frequency component in said each frequency bin;

a frequency bin echo path characteristic estimator using a far-end output signal amplitude spectrum of each frequency bin determined to have a frequency component by said frequency bin component detector and a near-end input signal amplitude spectrum of a corresponding frequency bin to estimate an echo path characteristic of the frequency bin;

an estimated-echo signal calculator calculating an estimated echo signal from the echo path characteristic for each determined frequency bin; and an echo suppressor suppressing the estimated echo signal from the near-end input signal amplitude spectrum.

* * * * *